(12) United States Patent
Kilshaw et al.

(10) Patent No.: US 10,958,159 B1
(45) Date of Patent: Mar. 23, 2021

(54) REVERSED-OPERATION POWER CONVERTER STARTUP CIRCUIT AND METHOD

(71) Applicant: pSemi Corporation, San Diego, CA (US)

(72) Inventors: David Andrew Kilshaw, Mortimer (GB); Mark Moffat, Mortimer (GB); Nigel David Brooke, Chippenham (GB)

(73) Assignee: pSemi Corporation, San Diego, CA (US)

( * ) Notice: Subject to any disclaimer, the term of this patent is extended or adjusted under 35 U.S.C. 154(b) by 0 days.

(21) Appl. No.: 16/749,785

(22) Filed: Jan. 22, 2020

(51) Int. Cl.
*H02M 1/36* (2007.01)
*H02M 1/32* (2007.01)
*H02M 3/07* (2006.01)

(52) U.S. Cl.
CPC .............. *H02M 1/36* (2013.01); *H02M 1/32* (2013.01); *H02M 3/073* (2013.01)

(58) Field of Classification Search
None
See application file for complete search history.

(56) References Cited

U.S. PATENT DOCUMENTS 8,604,869 B1 * 12/2013 Ma .......................... H02M 3/07
  327/143
9,742,262 B1 * 8/2017 Jutras ...................... H02M 1/36

* cited by examiner

*Primary Examiner* — Jeffery S Zweizig
(74) *Attorney, Agent, or Firm* — Jaquez Land Greenhaus LLP; John Land, Esq.

(57) ABSTRACT

Circuits and methods for providing at least a startup voltage for reversed-operation unidirectional power converters or bi-modal power converters sufficient to power at least an auxiliary circuit of such power converters while the normal supply voltage to at least the auxiliary circuit is insufficient to enable operation of the auxiliary circuit. Embodiments of the invention utilize an initial startup charge pump circuit to create a suitable startup voltage while the normal supply voltage to the auxiliary circuit is less than a specified voltage $V_{MIN}$. Embodiments of the present invention also provide additional benefits, including small size since the initial startup charge pump circuit omits the use of an inductor, and high efficiency since the initial startup charge pump circuit may be disabled when the normal supply voltage to the auxiliary circuit is equal to or greater than $V_{MIN}$.

18 Claims, 9 Drawing Sheets

FIG. 3
(Non-Operational Configuration)

1002 — Configuring a power converter to include (1) a converter circuit configured to be coupled to an input voltage $V_{IN}$ and output a voltage $V_{OUT}$ to a load; (2) a controller, coupled to the converter circuit and configured to control the converter circuit to cause the converter circuit to either boost or buck $V_{IN}$ to $V_{OUT}$; and (3) an auxiliary circuit, coupled to the controller and configured to provide various voltages and/or signals to the controller

1004 — Coupling an initial startup charge pump circuit to $V_{IN}$ and to the auxiliary circuit, the initial startup charge pump circuit including (1) a charge pump oscillator having an output that includes a train of pulses; and (2) a charge pump core, coupled to the output of the charge pump oscillator and to $V_{IN}$, configured to output a stepped-up voltage $V_{PUMP}$ greater than $V_{IN}$, wherein $V_{PUMP}$ is coupled to the auxiliary circuit and is sufficient to power the auxiliary circuit

FIG. 10

REVERSED-OPERATION POWER CONVERTER STARTUP CIRCUIT AND METHOD

BACKGROUND

(1) Technical Field

This invention relates to electronic circuits, and more particularly to power converter circuits, including DC-DC power converters.

(2) Background

Many electronic products, particularly mobile computing and/or communication products and components (e.g., notebook computers, ultra-book computers, tablet devices, LCD and LED displays) require multiple voltage levels. For example, radio frequency transmitter power amplifiers may require relatively high voltages (e.g., 12V or more), whereas logic circuitry may require a low voltage level (e.g., 1-2V). Still other circuitry may require an intermediate voltage level (e.g., 5-10 V).

Power converters are often used to generate a lower or higher voltage from a common power source, such as a battery. Power converters include DC-DC or AC-DC power converters. One type of power converter comprises a converter circuit, control circuitry, and auxiliary circuitry such as bias voltage generator(s), a clock generator, a voltage regulator, a voltage control circuit, etc. Power converters which generate a lower output voltage level from a higher input voltage power source are commonly known as buck converters, so-called because $V_{OUT}$ is less than $V_{IN}$, and hence the converter is "bucking" the input voltage. Power converters which generate a higher output voltage level from a lower input voltage power source are commonly known as boost converters, because $V_{OUT}$ is greater than $V_{IN}$.

Figure 1:
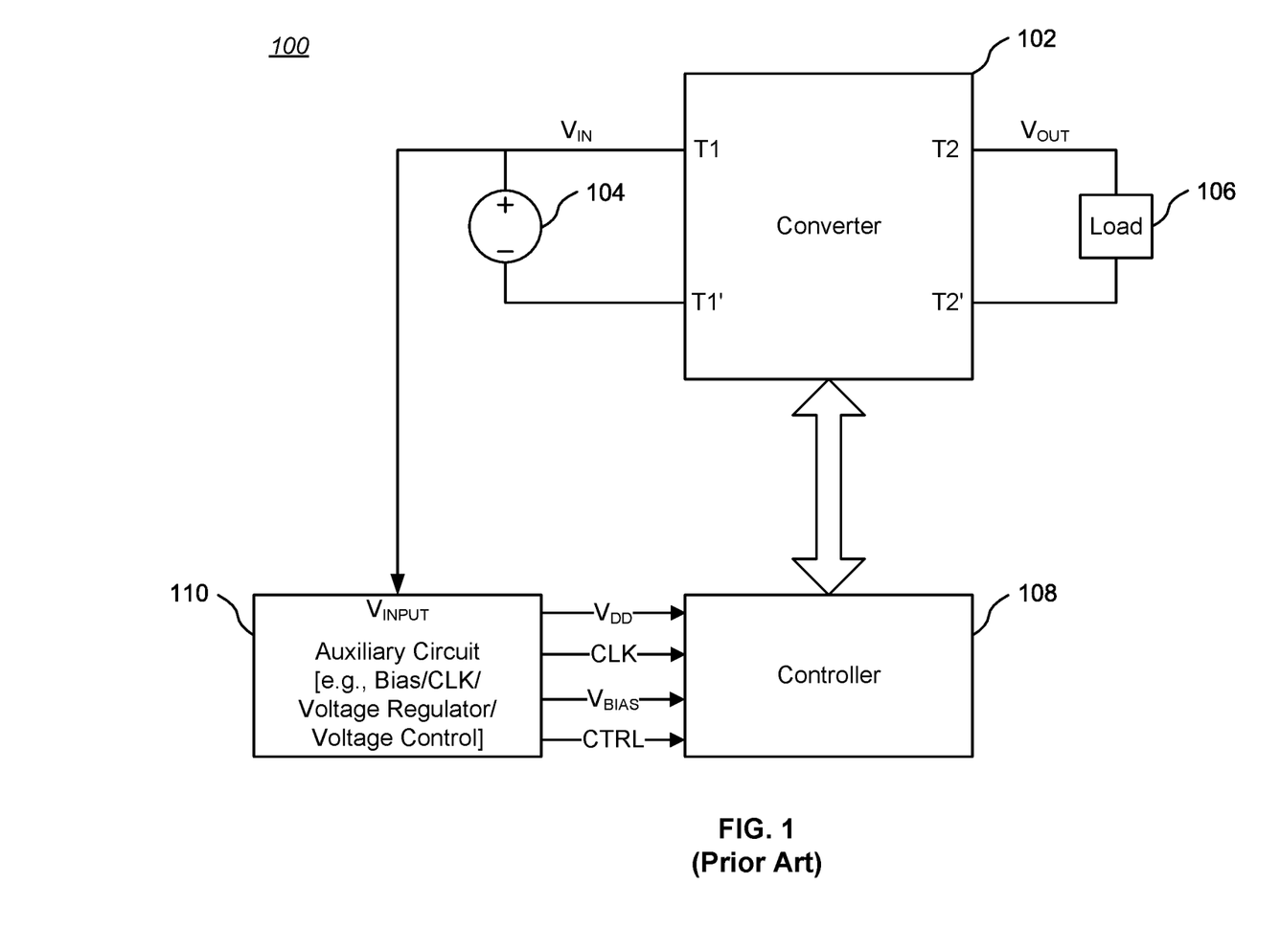
FIG. 1 is a block diagram of a prior art unidirectional power converter.

For example, FIG. 1 is a block diagram of a prior art unidirectional power converter 100. A converter circuit 102 having input terminals T1/T1' and output terminals T2/T2' is configured such that input terminals T1/T1' are coupled to a voltage source 104 (e.g., a battery) and output terminals T2/T2' are coupled to a load 106. In the illustrated example, the voltage applied across input terminals T1/T1' is $V_{IN}$, and the converted voltage provided across output terminals T2/T2' is $V_{OUT}$. The converter circuit 102 may be, for example, a charge pump. Examples of charge pumps include cascade multiplier, Dickson, Ladder, Series-Parallel, Fibonacci, and Doubler switched-capacitor networks. A controller 108 controls the internal components of the converter circuit 102 (e.g., internal switches, such as low voltage FETs, especially MOSFETs) to cause the converter circuit 102 to either boost or buck $V_{IN}$ to $V_{OUT}$. An auxiliary circuit 110 may provide various voltages and/or signals to the controller 108 (and optionally directly to the converter circuit 102), such as a voltage $V_{DD}$, a clock signal CLK, a circuit bias voltage $V_{BIAS}$, and one or more control signals CTRL. Power to the illustrated auxiliary circuit 110 is supplied at $V_{INPUT}$. (It should be noted that while this disclosure distinguishes between a power converter 100 and a converter circuit 102, much of the literature labels the entire power converter 100 as a "power converter", or labels the converter circuit as a "charge pump").

Many buck power converters and boost power converters are designed to be unidirectional, with most or all components of the converter circuit 102, the controller 108, and the auxiliary circuit 110 integrated within a single integrated circuit or circuit module. Accordingly, by design, the circuitry for a unidirectional power converter is powered from its input since a voltage source (e.g., a battery) is available at the input to provide power to the circuitry. For example, as shown in FIG. 1, the auxiliary circuit 110 is powered by the voltage $V_{IN}$ provided by the voltage source 104 coupled to $V_{INPUT}$ (as well as to the input terminal T1 of the converter circuit 102).

Figure 2:
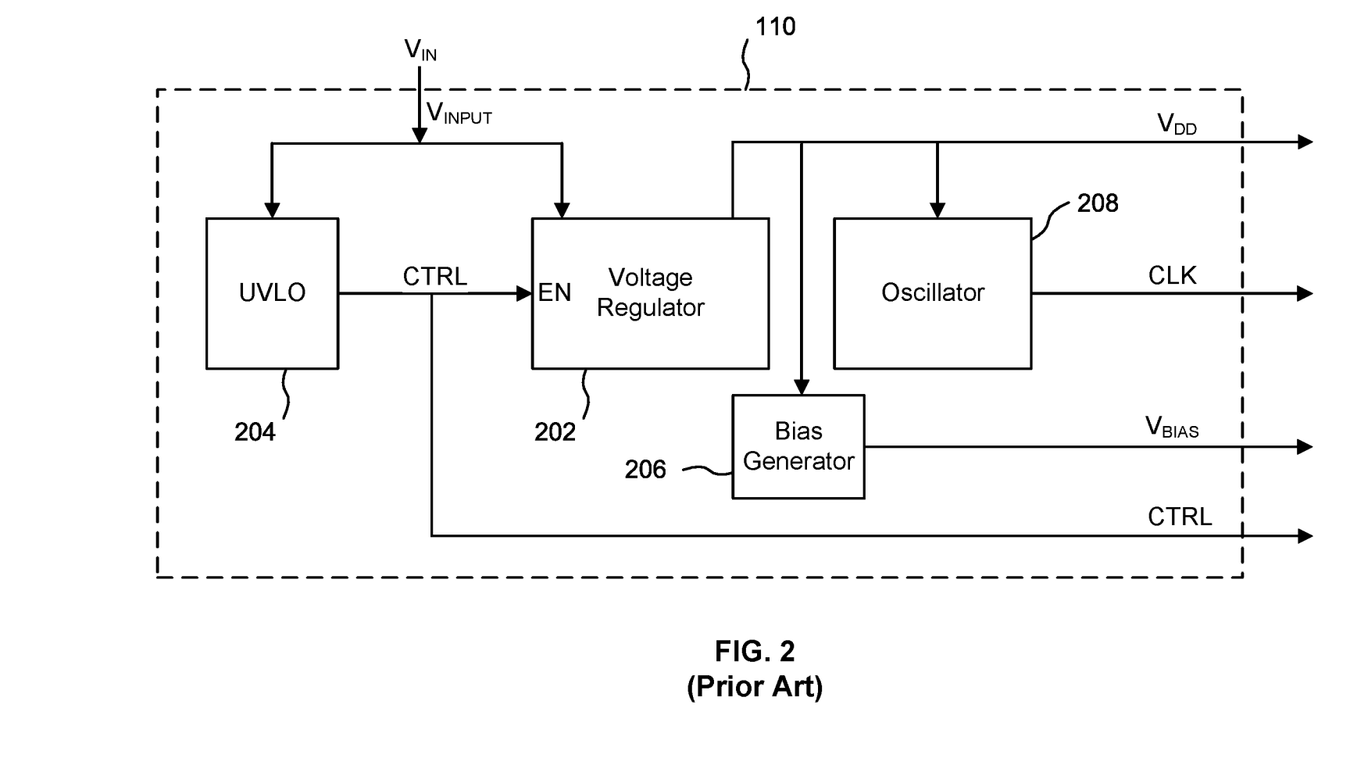
FIG. 2 is a block diagram showing one example of an auxiliary circuit for the power converter of FIG. 1.

FIG. 2 is a block diagram showing one example of an auxiliary circuit 110 for the power converter 100 of FIG. 1. A voltage $V_{IN}$ from the voltage source 104 is coupled to $V_{INPUT}$ and is applied to a voltage regulator 202 which generates a regulated output voltage $V_{DD}$ (e.g., 1.8V or 3.3V or 4.5V). An under-voltage lockout (UVLO) circuit 204 prevents operation of the voltage regulator 202 (and thus blocks output of $V_{DD}$) unless $V_{IN}$ exceeds a specified minimum value, $V_{MIN}$. The UVLO 204 may also supply a control signal CTRL to the controller 108 to disable or enable operation of the controller 108 depending on the voltage state of $V_{IN}$ being less than or at least $V_{MIN}$. The $V_{DD}$ output from the voltage regulator 202 may be coupled to a bias generator 206 which outputs a bias voltage $V_{BIAS}$ to the controller 108 (and optionally directly to the converter circuit 102), and to an oscillator which outputs one or more clock signals CLK (e.g., a single phase timing pulse, or two or more time pulse phases). Generally, low voltage FETs (particularly MOSFETs) would be used in most or all of the subcircuits within the auxiliary circuit 110. In variations, some of the voltages and/or signals (e.g., $V_{DD}$, $V_{BIAS}$, CLK) can be supplied externally from the system if available (thereby eliminating some components of the auxiliary circuit 110), but doing so makes the power converter 100 less self-contained and independent, which runs contrary to the industry trend towards greater integration of electronic circuitry.

At times it may be useful to utilize an existing unidirectional power converter in a reversed configuration, such that the $V_{IN}$ and $V_{OUT}$ voltages are switched relative to the nominal input terminals T1/T1' and output terminals T2/T2' of the converter circuit 102. Thus, for example, it may be useful to repurpose a circuit designed to be a unidirectional buck power converter to instead be a boost power converter, and vice versa, thereby expanding the range of applications for a single circuit design.

Further, unidirectional power converters are not suited for all applications. For example, a number of electronic applications may require rechargeable battery power, configured such that power may flow from a battery to a load at times, while at other times power is flowing in the reverse direction to recharge the battery. Such applications may include, for example, laptop computers having two separate batteries and electric vehicles. In the example of electric vehicles, an internal combustion engine and/or regenerative braking may provide recharge power to a battery that is otherwise used for powering an electric drive train. Such applications generally require a bidirectional power converter or a bi-modal power converter that can be dynamically configured as either a buck or a boost converter, with the mode of operation being selectable by control circuitry; accordingly, at times, the application of voltages $V_{IN}$ and $V_{OUT}$ are effectively swapped at the input and output terminals of the converter circuit 102.

Figure 3:
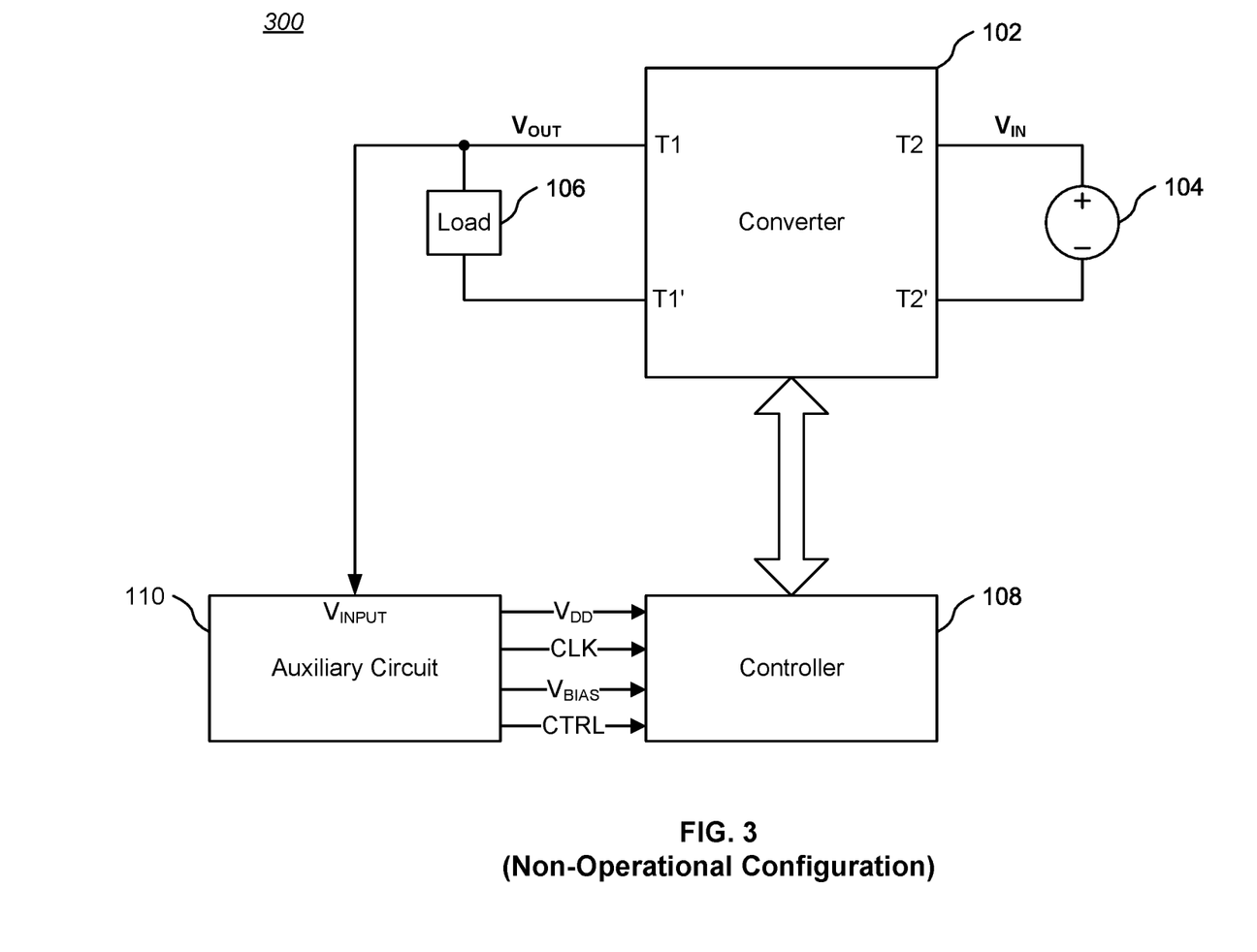
FIG. 3 shows a block diagram of a non-operational configuration of the unidirectional power converter of FIG. 1 in which the voltage source and load are swapped.

A problem that arises with power converters operated in a "reversed" mode is that an adequate voltage does not exist at the effective output terminals until the converter circuit 102 in conjunction with the control circuitry generate an output voltage $V_{OUT}$ from an input voltage $V_{IN}$ applied at the effective input terminals. For example, FIG. 3 shows a block diagram 300 of a non-operational configuration of the unidirectional power converter circuit 100 of FIG. 1 in which the voltage source 104 and load 106 are swapped for a reversed mode of operation. More particularly, the converter circuit 102 is configured such that input terminals T1/T1' are coupled to a load 106 and the output terminals T2/T2' are coupled to a voltage source 104; thus, the labels $V_{OUT}$ and $V_{IN}$ are also reversed compared to FIG. 1. Accordingly, the voltage coupled to $V_{INPUT}$ of the auxiliary circuit 110 is $V_{OUT}$ rather than $V_{IN}$, as in FIG. 1. In the configuration illustrated in FIG. 3, the voltage at $V_{OUT}$ may be zero or too low to power the auxiliary circuit 110 since the converter circuit 102 is not yet fully operational, all because the auxiliary circuit 110 has insufficient voltage to make the controller 108 operational—a circular startup problem. Only when $V_{OUT}$ meets or exceeds a specified minimum voltage $V_{MIN}$ would the auxiliary circuit 110 become operational.

An existing solution to the startup problem is to create a separate voltage supply that supplies the necessary voltage to power the auxiliary circuit 110 regardless of direction of power conversion; that is, neither $V_{OUT}$ nor $V_{IN}$ from the converter circuit 102 is directly used to power the auxiliary circuit 110. This solution is complex, often requiring an inductor-based boost regulator. Inductors are usually much larger in overall size and more expensive than capacitors.

Accordingly, there is a need for circuits and methods for providing at least a startup voltage for reversed-operation power converters sufficient to power the auxiliary circuit 110 of such power converters while the normal supply voltage to the auxiliary circuit 110 is insufficient. The present invention meets this need and provides additional benefits.

SUMMARY

The present invention encompasses circuits and methods for providing at least a startup voltage for reversed-operation unidirectional power converters or bi-modal power converters sufficient to power an auxiliary circuit of such power converters while the normal supply voltage to the auxiliary circuit is insufficient to enable operation of the auxiliary circuit. Embodiments of the invention utilize an initial startup charge pump circuit to create a suitable startup voltage while the normal supply voltage to the auxiliary circuit is less than a specified voltage $V_{MIN}$. Embodiments of the present invention also provide additional benefits, including lower cost and overall size compared to conventional solutions, and power efficiency since the initial startup charge pump circuit may be disabled when the normal supply voltage to the auxiliary circuit is equal to or greater than $V_{MIN}$.

Some embodiments include an initial startup charge pump circuit configured to be coupled to a power converter having an auxiliary circuit and configured to be coupled to a voltage $V_{IN}$, the initial startup charge pump circuit being configured to output a stepped-up voltage $V_{PUMP}$ greater than $V_{IN}$, wherein $V_{PUMP}$ is coupled to the auxiliary circuit and is equal to or greater than $V_{MIN}$ and thus sufficient to power the auxiliary circuit.

In some embodiments, the initial startup charge pump circuit includes a charge pump oscillator having an output that includes a train of pulses, and a charge pump core, coupled to the output of the charge pump oscillator and to a voltage supply coupled to a power converter and providing a voltage $V_{IN}$, the charge pump core being configured to output a stepped-up voltage $V_{PUMP}$ greater than $V_{IN}$, wherein $V_{PUMP}$ is coupled to an auxiliary circuit of the power converter and is sufficient to power the auxiliary circuit.

In some embodiments, the initial startup charge pump circuit is a stand-alone integrated circuit separate from a power converter, while in other embodiments, the initial startup charge pump circuit is integrated with most or all of the components of a power converter. The power converter may include the following: a converter circuit configured to be coupled between a voltage $V_{IN}$ and output a voltage $V_{OUT}$ to a load; a controller, coupled to the converter circuit and configured to control the converter circuit to cause the converter circuit to either boost or buck $V_{IN}$ to $V_{OUT}$; and an auxiliary circuit, coupled to the controller and configured to provide various voltages and/or signals to the controller. The power converter may be a reversed unidirectional power converter or a bi-modal power converter. Some embodiments may include a current in-rush protection circuit to limit current flow from an input voltage source to a coupled power converter for a period of time.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference numbers and designations in the various drawings indicate like elements.

DETAILED DESCRIPTION

The present invention encompasses circuits and methods for providing at least a startup voltage for reversed-operation unidirectional power converters or bi-modal power converters sufficient to power an auxiliary circuit of such power converters while the normal supply voltage to the auxiliary circuit is insufficient to enable operation of the auxiliary circuit. Embodiments of the invention utilize an initial startup charge pump circuit to create a suitable startup voltage while the normal supply voltage to the auxiliary circuit is less than a specified voltage $V_{MIN}$. Embodiments of the present invention also provide additional benefits, including higher efficiency and smaller size compared to conventional solutions, since the initial startup charge pump circuit omits the use of an inductor.

Figure 4:
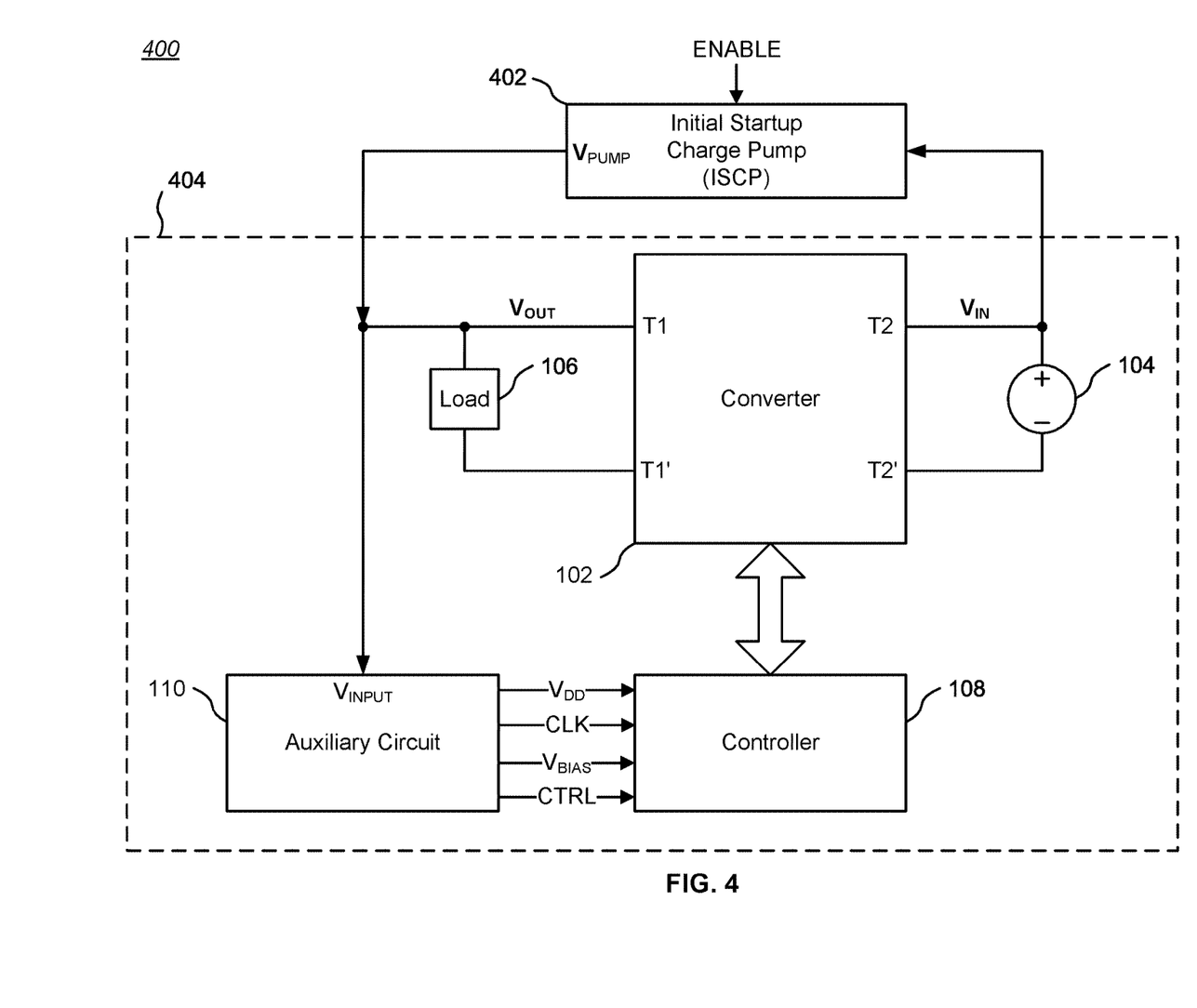
FIG. 4 is a block diagram of a generalized initial startup charge pump coupled to a power converter, which may be a reversed unidirectional power converter or a bi-modal power converter.

FIG. 4 is a block diagram 400 of a generalized initial startup charge pump 402 coupled to a power converter 404, which may be a reversed unidirectional power converter or a bi-modal power converter. The configuration of the power converter 404 is the same as the non-operational configuration shown in FIG. 3, but made operational by the addition of the initial startup charge pump (ISCP) 402. The ISCP 402 has an input coupled to $V_{IN}$ from the voltage source 104 (e.g., a battery, such as a 4.25 V cell) and an output $V_{PUMP}$ coupled to $V_{INPUT}$ of the auxiliary circuit 110 (as well as to the input terminal T1 of the converter circuit 102).

In operation, the ISCP 402 is powered by $V_{IN}$ supped from the voltage source 104. Operating as a boost charge pump, the ISCP 402 receives $V_{IN}$ and outputs an increased voltage $V_{PUMP}$ (i.e., such that $V_{PUMP} > V_{IN}$) to the auxiliary circuit 110 that is designed to equal or exceed $V_{MIN}$, the minimum voltage needed to sufficiently power the particular auxiliary circuit 110. $V_{MIN}$ may vary in different circuit configurations, depending on the voltage requirements of the components within the auxiliary circuit 110. Accordingly, the ISCP 402 should be designed to boost $V_{IN}$ by a suitable multiplier.

In the illustrated embodiment, the ISCP 402 also has an optional ENABLE control input that selectively enables the ISCP 402 (e.g., for startup of the power converter 404) or disables the ISCP 402 (e.g., after the power converter 404 is fully operational). A benefit of the optional ENABLE control input is higher efficiency compared to conventional solutions, since the ISCP 402 may be disabled when the output voltage $V_{OUT}$ from the converter circuit 102 is sufficient to power the auxiliary circuit 110. The ENABLE control input may be generated in a number of ways. For example, a clocking circuit (not shown) set for a specified period of startup time may be used to enable the ISCP 402 until the period times out, at which point the ISCP 402 is disabled and draws no power. As another example, a voltage output monitoring circuit (not shown) may be configured to enable ISCP 402 only when $V_{OUT} < V_{MIN}$, and otherwise disable the ISCP 402.

As should be clear, when $V_{IN}$ from the voltage source 104 is coupled to terminals T1/T1' rather than to terminals T2/T2' (for example, as happens from time to time with a bi-modal power converter, or when a nominally unidirectional power converter is operated in normal forward mode rather than in a reversed mode), the auxiliary circuit 110 is directly powered by $V_{IN}$ and the ISCP 402 may be disabled.

Figure 5:
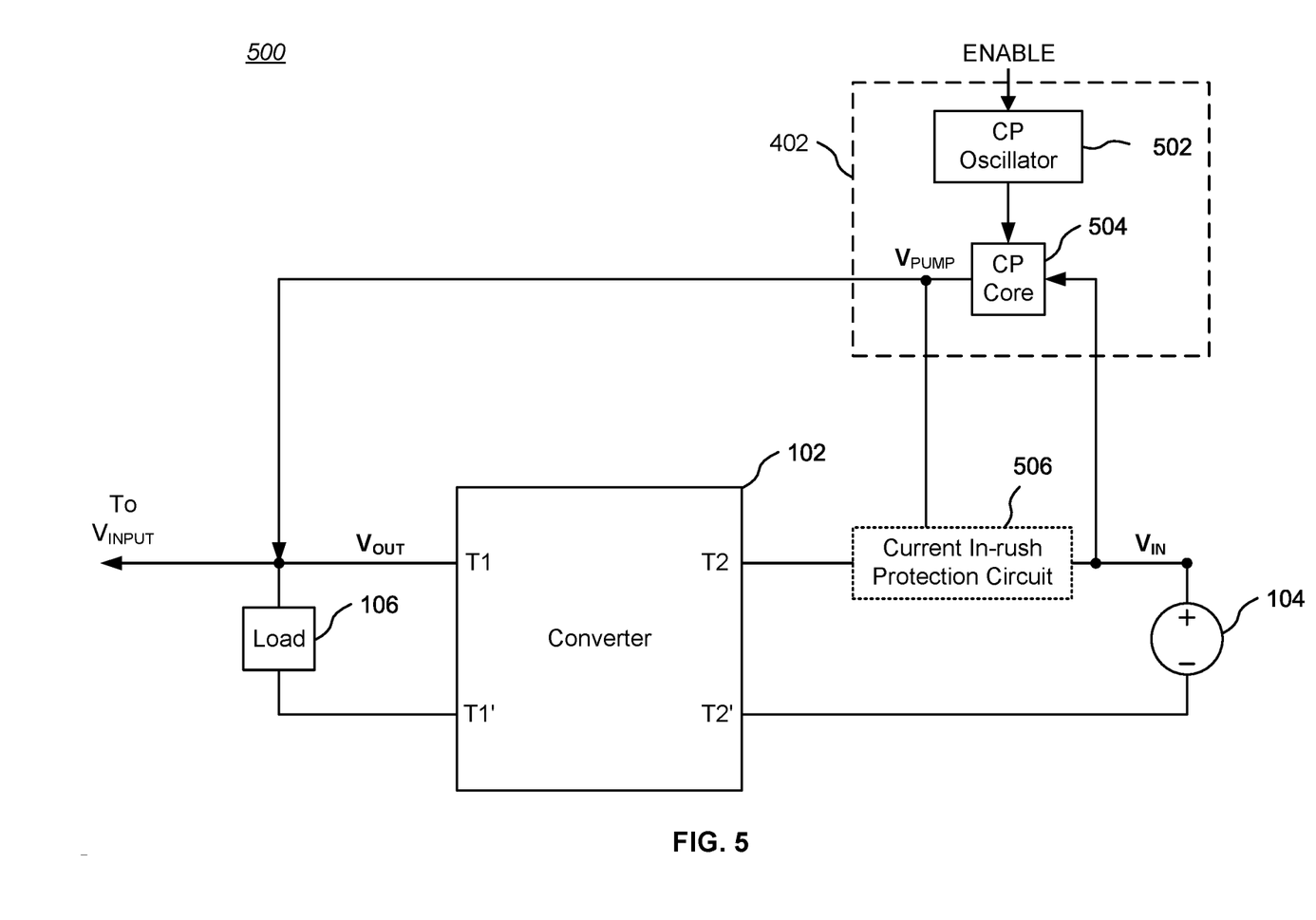
FIG. 5 is a block diagram of a more detailed portion of one embodiment of the circuit shown in FIG. 4.

FIG. 5 is a block diagram 500 of a more detailed portion of one embodiment of the circuit shown in FIG. 4. In the illustrated example, the ISCP 402 comprises a charge pump (CP) oscillator 502 coupled to a charge pump (CP) core 504. The CP oscillator 502 provides a train of pulses, such as square wave pulses, to the CP core 504. The CP core 504 is a boost power converter designed to increase $V_{IN}$ to $V_{PUMP}$ (i.e., such that $V_{PUMP} > V_{IN}$). As one example, the CP core 504 may be a Dickson charge pump. As noted above, the optional ENABLE control input selectively enables or disables the ISCP 402, such as by starting or stopping the CP oscillator 502.

Also shown in FIG. 5 is an optional current in-rush protection circuit 506 designed to limit current to the converter circuit 102 from the voltage source 104 until the converter circuit 102 becomes operational. In the illustrated example, the current in-rush protection circuit 506 is designed to be controlled by $V_{PUMP}$ and limit current flow from the voltage source 104 to the converter circuit 102 for a period of time at startup.

Figure 6:
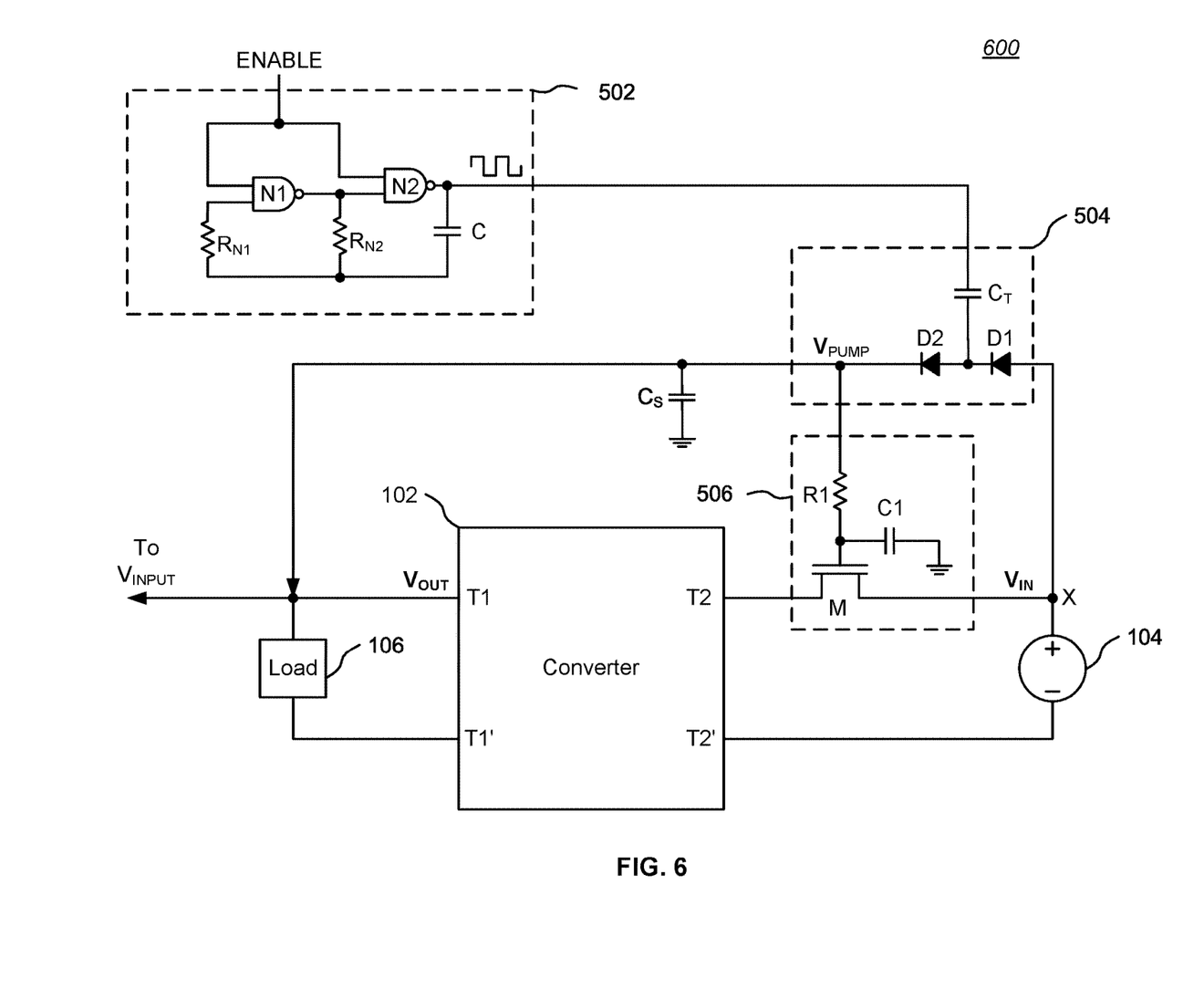
FIG. 6 is a more detailed schematic view of one example embodiment of the block diagram circuit of FIG. 5.

FIG. 6 is a more detailed schematic view 600 of one example embodiment of the block diagram circuit of FIG. 5. In the illustrated example, the CP oscillator 502 is a relaxation oscillator that includes series-connected NAND gates N1, N2. The NAND gates N1, N2 output a periodic waveform, such as a train of square wave pulses. The NAND gates N1, N2 may comprise low-voltage FETs (particularly MOSFETs) powered by $V_{IN}$ and are enabled or disabled by the state of the ENABLE control input (e.g., a logic "0"=DISABLE, and a logic "1"=ENABLE). The capacitor C couples the output of the CP oscillator 502 back into NAND gates N1, N2 through respective resistors $R_{N1}$, $R_{N2}$; in one example circuit, the capacitor C has a value of about 1 μF, the resistor $R_{N1}$ has a value of about 50 kΩ, and the resistor $R_{N2}$ has a value of about 5 kΩ. The capacitor C together with resistors $R_{N1}$, $R_{N2}$ form a time constant that sets the frequency of oscillation of the circuit. The frequency of oscillation is determined by the inverse of $(2.2 \times R_{N2} \times C)$ if $R_{N1}$ is 10 times $R_{N2}$. As should be clear, other circuits may be used to output a periodic waveform suitable for driving the CP core 504, including a ring oscillator.

The CP core 504 shown in FIG. 6 is a simple Dickson charge pump comprising, in this example, two series-connected diodes D1, D2 and a transfer capacitor $C_T$. The input of diode D1 is coupled to $V_{IN}$ while the output of diode D1 is coupled to the input of diode D2. The transfer capacitor $C_T$ is coupled between the output of the CP oscillator 502 and a node between the output of diode D1 and the input of diode D2. The output of diode D2 is $V_{PUMP}$. In operation, as $V_{IN}$ is applied to diode D1, the periodic waveform output by the CP oscillator 502 is applied to one terminal of the transfer capacitor $C_T$. The alternating charge across transfer capacitor $C_T$ is added to $V_{IN}$ to generate $V_{PUMP}$, and thus $V_{PUMP}$ is greater than $V_{IN}$.

In one example embodiment, the transfer capacitor $C_T$ has a value of about 10 g. An optional smoothing capacitor $C_S$ removes ripple content from $V_{PUMP}$; in one example embodiment, the smoothing capacitor $C_S$ has a value of about 10 μF. In some embodiments, the smoothing capacitor $C_S$ is not necessary if the load 106 has a large output capacitance. The smoothing capacitor $C_S$ is also useful for local bypassing relative to the current in-rush protection circuit 506 and if both the CP core 504 and the current in-rush protection circuit 506 (if present) are located far away from the load 106.

For the circuit shown in FIG. 6, if $V_{IN}$ is about 4.25V, such as from some types of lithium-ion batteries, the CP core 504 can generate an output $V_{PUMP}$ of about 5V (after accounting for the voltage drops across diodes D1, D2), which may be sufficient to power a low-voltage auxiliary circuit 110. More generally, the component values and number of charge pump stages of the CP core 504 should be sized to generate $V_{PUMP}$ at a voltage of at least $V_{MIN}$. As should be clear, other charge pump topologies, such as series-parallel, ladder, or Fibonacci, may be used to convert $V_{IN}$ up to $V_{PUMP}$.

In the example illustrated in FIG. 6, the current in-rush protection circuit 506 includes a transistor M in series between the voltage source 104 and the converter circuit 102. The gate of the transistor M is controlled by an RC circuit including a resistor R1 coupled between $V_{PUMP}$ and the gate, with a shunt capacitor C1 coupled between the gate and circuit ground; the time constant of the RC circuit controls the conductivity of the transistor M, slowly biasing the transistor M from an OFF (non-conductive) state to an ON (conductive) state as $V_{PUMP}$ ramps up. Accordingly, the current in-rush protection circuit 506 limits current flow from the voltage source 104 to the converter circuit 102 for a period of time. In one example circuit, resistor R1 has a value of about 1 kΩ and capacitor C1 has a value of about 10 µF.

As should be apparent from FIGS. 4-6, the ISCP 402 is effectively an auxiliary charge pump coupled in parallel with the converter circuit 102, but needed only under certain circumstances. For example, as noted above, the ISCP 402 enables utilization of an existing unidirectional power converter in a reversed configuration, such that the connections of $V_{IN}$ and $V_{OUT}$ to the terminals T1/T1', T2/T2' of the converter circuit 102 are switched, as shown in FIGS. 4-6. In such an application, it may only be necessary to enable the ISCP 402 at circuit startup until $V_{OUT}$ from the converter circuit 102 is sufficient to operate the auxiliary circuit 110 (i.e., is equal to or greater than $V_{MIN}$). Thereafter, the ISCP 402 may be disabled using the ENABLE control input. However, if $V_{OUT}$ should fall to less than $V_{MIN}$, the ISCP 402 may be re-enabled by the ENABLE control input so as to generate $V_{PUMP}$ to supply power to the auxiliary circuit 110. For example, a voltage output monitoring circuit (not shown) coupled to $V_{OUT}$ in FIG. 4 may detect occasions when $V_{OUT} < V_{MIN}$, and provide an input to control circuitry that sets an "enabled" state for the ENABLE control input to the ISCP 402.

As another example, the ISCP 402 may also be used with a bi-modal power converter, in which the voltage source 104 may be coupled to terminals T1/T1' in a first mode of operation, while the voltage source 104 may be coupled to terminals T2/T2' in a second mode of operation. In such an application, it may be necessary to enable the ISCP 402 during each switch to the second mode of operation until the voltage supplied to $V_{INPUT}$ is sufficient to operate the auxiliary circuit 110 (i.e., is equal to or greater than $V_{MIN}$). Accordingly, in such applications, the ISCP 402 may be occasionally enabled or disabled using the ENABLE control input. Thus, if $V_{OUT}$ should fall to less than $V_{MIN}$, the ISCP 402 may be enabled by the ENABLE control input so as to generate $V_{PUMP}$ to supply power to the auxiliary circuit 110. For example, a voltage output monitoring circuit (not shown) coupled to $V_{OUT}$ in FIG. 4 may detect occasions when $V_{OUT} < V_{MIN}$ and provide an input to control circuitry that generates an "enabled" state for the ENABLE control input. As another example, the ENABLE control input may be set to the "enabled" state by control circuitry (not shown) that actively switches the mode of operation for a bi-modal power converter.

As noted above, most or all components of a power converter, such as the converter circuit 102, the controller 108, and the auxiliary circuit 110, may be integrated within a single integrated circuit or circuit module (noting that some relatively large components, such as capacitors, may be external). An ISCP 402 may also be integrated within the same single integrated circuit or circuit module, or may be fabricated as part of a separate integrated circuit or circuit module configured to be coupled to the other components of a power converter.

Methods

Figure 7:
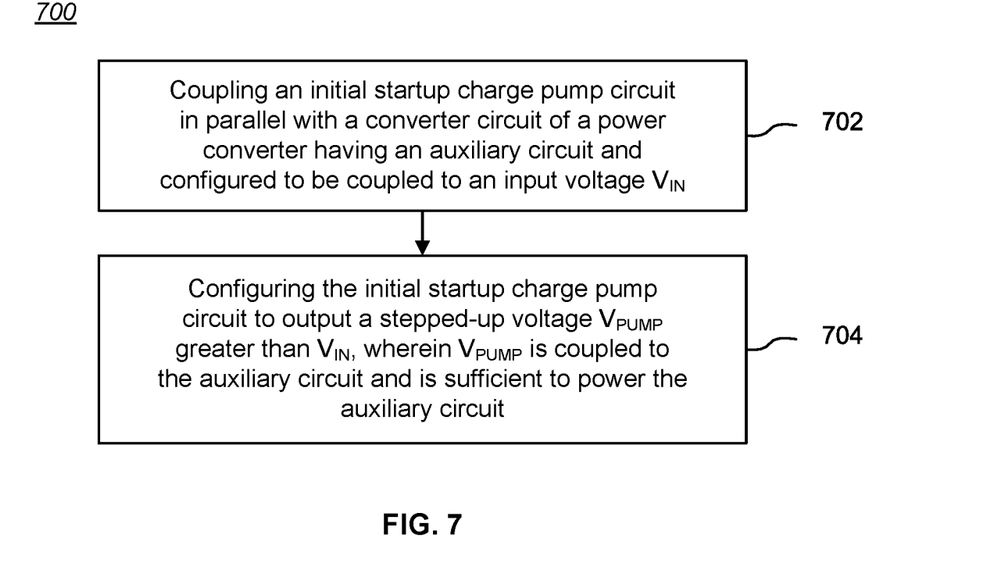
FIG. 7 is a process flow chart showing a first method for starting up a power converter.

Another aspect of the invention includes methods for starting up a power converter, and more particularly methods for providing at least a startup voltage for reversed unidirectional power converters or bi-modal power converters sufficient to power the auxiliary circuit of such power converters while the normal supply voltage to the auxiliary circuit is insufficient. For example, FIG. 7 is a process flow chart 700 showing a first method for starting up a power converter. The method includes: coupling an initial startup charge pump circuit in parallel with a converter circuit of a power converter having an auxiliary circuit and configured to be coupled to an input voltage $V_{IN}$ (Block 702); and configuring the initial startup charge pump circuit to output a stepped-up voltage $V_{PUMP}$ greater than $V_{IN}$, wherein $V_{PUMP}$ is coupled to the auxiliary circuit and is sufficient to power the auxiliary circuit (Block 704).

Figure 8:
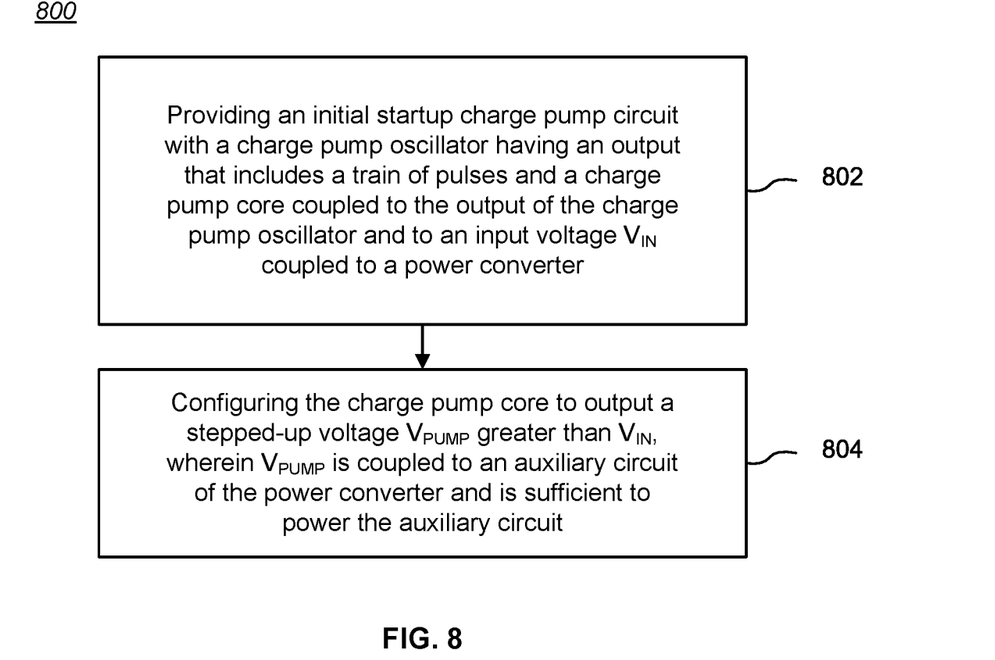
FIG. 8 is a process flow chart showing a second method for starting up a power converter.

As another example, FIG. 8 is a process flow chart 800 showing a second method for starting up a power converter. The method includes: providing the initial startup charge pump circuit with a charge pump oscillator having an output that includes a train of pulses and a charge pump core coupled to the output of the charge pump oscillator and to an input voltage $V_{IN}$ coupled to a power converter circuit (Block 802); and configuring the charge pump core to output a stepped-up voltage $V_{PUMP}$ greater than $V_{IN}$, wherein $V_{PUMP}$ is coupled to an auxiliary circuit of the power converter and is sufficient to power the auxiliary circuit (Block 804).

Figure 9:
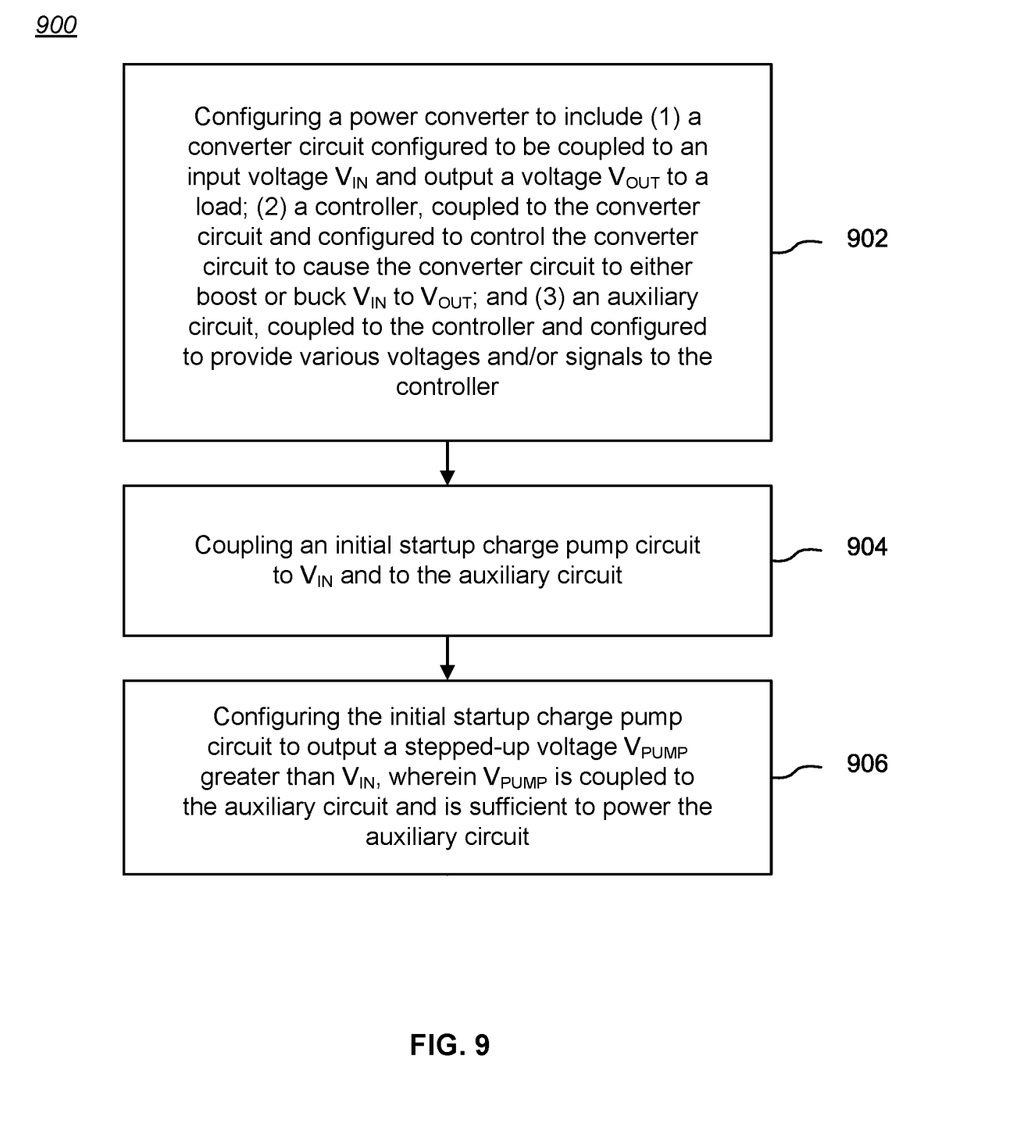
FIG. 9 is a process flow chart showing a third method for starting up a power converter.

As yet another example, FIG. 9 is a process flow chart 900 showing a third method for starting up a power converter. The method includes: configuring a power converter circuit to include (1) a converter circuit configured to be coupled to an input voltage $V_{IN}$ and output a voltage $V_{OUT}$ to a load; (2) a controller, coupled to the converter circuit and configured to control the converter circuit to cause the converter circuit to either boost or buck $V_{IN}$ to $V_{OUT}$; and (3) an auxiliary circuit, coupled to the controller and configured to provide various voltages and/or signals to the controller (Block 902); coupling an initial startup charge pump circuit to $V_{IN}$ and to the auxiliary circuit (Block 904); and configuring the initial startup charge pump circuit to output a stepped-up voltage $V_{PUMP}$ greater than $V_{IN}$, wherein $V_{PUMP}$ is coupled to the auxiliary circuit and is sufficient to power the auxiliary circuit (Block 906).

Figure 10:
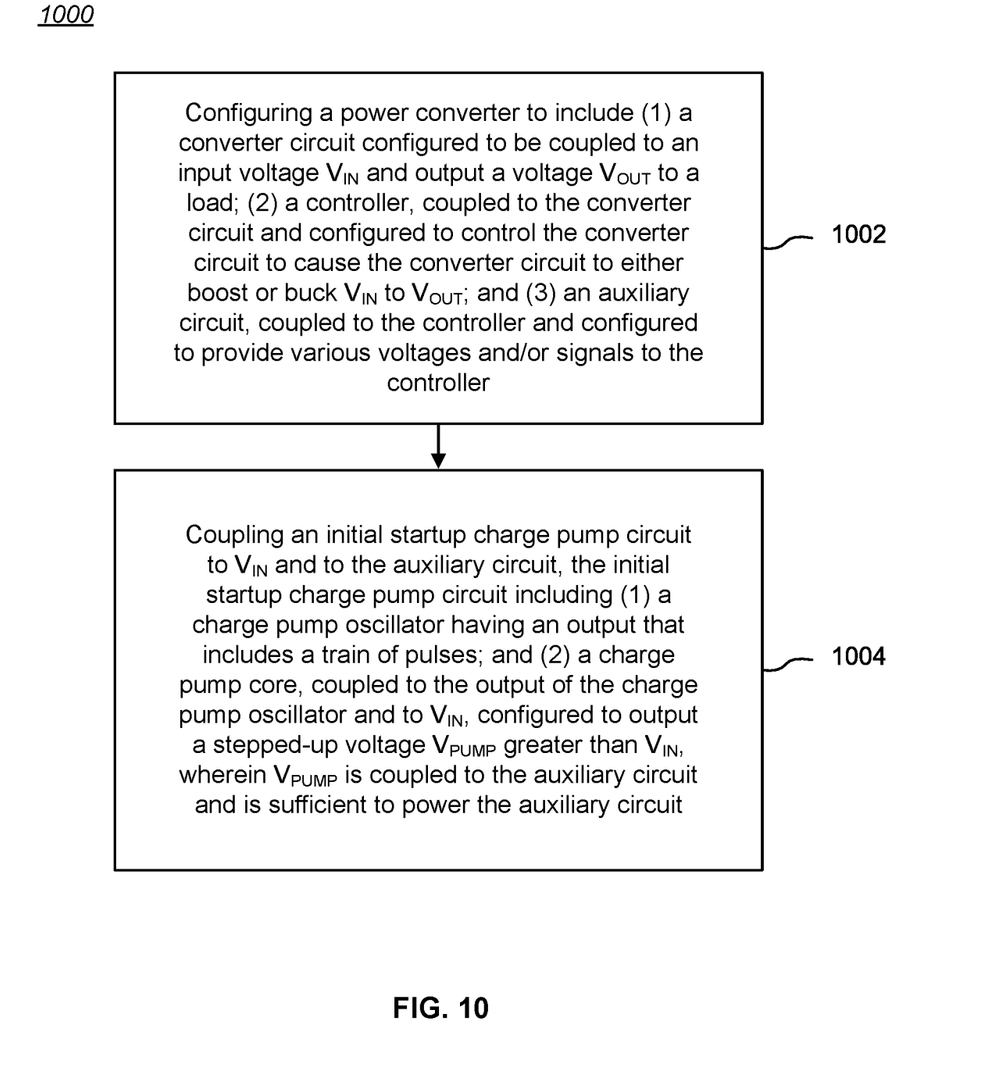
FIG. 10 is a process flow chart showing a fourth method for starting up a power converter.

As still another example, FIG. 10 is a process flow chart 1000 showing a fourth method for starting up a power converter. The method includes: configuring a power converter circuit to include (1) a converter configured to be coupled to an input voltage $V_{IN}$ and output a voltage $V_{OUT}$ to a load; (2) a controller, coupled to the converter circuit and configured to control the converter circuit to cause the converter circuit to either boost or buck $V_{IN}$ to $V_{OUT}$; and (3) an auxiliary circuit, coupled to the controller and configured to provide various voltages and/or signals to the controller (Block 1002); and coupling an initial startup charge pump circuit to $V_{IN}$ and to the auxiliary circuit, the initial startup charge pump circuit including (1) a charge pump oscillator having an output that includes a train of pulses; and (2) a charge pump core, coupled to the output of the charge pump oscillator and to $V_{IN}$, configured to output a stepped-up voltage $V_{PUMP}$ greater than $V_{IN}$, wherein $V_{PUMP}$ is coupled to the auxiliary circuit and is sufficient to power the auxiliary circuit (Block 1004).

Additional aspects of the above methods may include one or more of the following: disabling the initial startup charge pump circuit after a normal supply voltage from the power converter or the converter circuit to the auxiliary circuit is sufficient to enable operation of the auxiliary circuit; enabling the initial startup charge pump circuit while a normal supply voltage from the converter circuit of the power converter or the converter circuit to the auxiliary circuit is insufficient to enable operation of the auxiliary circuit; configuring the initial startup charge pump circuit to be coupled to and provide $V_{PUMP}$ to one of a reversed unidirectional power converter or a bi-modal power converter; coupling a current in-rush protection circuit in series between the input source and the power converter or the converter circuit, powering the current in-rush protection circuit by $V_{PUMP}$, and configuring the current in-rush protection circuit to limit current flow from the input source to the power converter or the converter circuit for a period of time.

Fabrication Technologies & Options

The term "MOSFET", as used in this disclosure, includes any field effect transistor (FET) having an insulated gate whose voltage determines the conductivity of the transistor, and encompasses insulated gates having a metal or metal-like, insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, silicon-on-insulator (SOI), and silicon-on-sapphire (SOS). Unless otherwise noted above, embodiments of the invention may be implemented in other transistor technologies such as bipolar, LDMOS, BCD, and MESFET technologies. However, embodiments of the invention are particularly useful when fabricated using an SOI or SOS based process, or when fabricated with processes having similar characteristics. Fabrication in CMOS using SOI or SOS processes enables circuits with low power consumption, the ability to withstand high power signals during operation due to FET stacking, good linearity, and high frequency operation (i.e., radio frequencies up to and exceeding 50 GHz). Monolithic IC implementation is particularly useful since parasitic capacitances generally can be kept low (or at a minimum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

Circuits and devices in accordance with the present invention may be used alone or in combination with other components, circuits, and devices. Embodiments of the present invention may be fabricated as integrated circuits (ICs), which may be encased in IC packages and/or or modules for ease of handling, manufacture, and/or improved performance. In particular, IC embodiments of this invention are often used in modules in which one or more of such ICs are combined with other circuit blocks (e.g., filters, passive components, and possibly additional ICs) into one package. The ICs and/or modules are then typically combined with other components, often on a printed circuit board, to form an end product such as a cellular telephone, laptop computer, or electronic tablet, or to form a higher level module which may be used in a wide variety of products, such as vehicles, test equipment, medical devices, etc. Through various configurations of modules and assemblies, such ICs typically enable a mode of communication, often wireless communication.

CONCLUSION

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. An initial startup charge pump circuit, configured to be coupled to a power converter having an auxiliary circuit and configured to be coupled to an input voltage source supplying a voltage $V_{IN}$ to the power converter, the initial startup charge pump circuit configured to output a stepped-up voltage $V_{PUMP}$ greater than $V_{IN}$, wherein $V_{PUMP}$ is coupled to the auxiliary circuit and is sufficient to power the auxiliary circuit, and further including a current in-rush protection circuit coupled in series between $V_{IN}$ and the power converter, and coupled to and controlled by $V_{PUMP}$, the current in-rush protection circuit configured to limit current flow from $V_{IN}$ to the power converter for a period of time.

2. The invention of claim 1, wherein the initial startup charge pump circuit can be selectively disabled after a normal supply voltage from the power converter to the auxiliary circuit is sufficient to enable operation of the auxiliary circuit.

3. The invention of claim 1, wherein the initial startup charge pump circuit can be selectively enabled while a normal supply voltage from the power converter to the auxiliary circuit is insufficient to enable operation of the auxiliary circuit.

4. The invention of claim 1, wherein the initial startup charge pump circuit is configured to be coupled to and provides $V_{PUMP}$ to one of a unidirectional power converter operated in a reverse configuration, or a bi-modal power converter.

5. An initial startup charge pump circuit, configured to be coupled to a power converter, including:

(a) a charge pump oscillator having an output that includes a train of pulses;

(b) a charge pump core, coupled to the output of the charge pump oscillator and to an input voltage source supplying a voltage $V_{IN}$ coupled to the power converter, configured to output a stepped-up voltage $V_{PUMP}$ greater than $V_{IN}$, wherein $V_{PUMP}$ is coupled to an auxiliary circuit of the power converter and is sufficient to power the auxiliary circuit; and (c) a current in-rush protection circuit coupled in series between $V_{IN}$ and the power converter, and coupled to and controlled by $V_{PUMP}$, the current in-rush protection circuit configured to limit current flow from $V_{IN}$ to the power converter for a period of time.

6. The invention of claim 5, wherein the initial startup charge pump circuit can be selectively disabled after a normal supply voltage from the power converter to the auxiliary circuit is sufficient to enable operation of the auxiliary circuit.

7. The invention of claim 5, wherein the initial startup charge pump circuit can be selectively enabled while a normal supply voltage from the power converter to the auxiliary circuit is insufficient to enable operation of the auxiliary circuit.

8. The invention of claim 5, wherein the initial startup charge pump circuit is configured to be coupled to and provides $V_{PUMP}$ to one of a unidirectional power converter operated in a reverse configuration, or a bi-modal power converter.

9. A power converter including:
(a) a converter circuit configured to be coupled between a voltage $V_{IN}$ and output a voltage $V_{OUT}$ to a load;
(b) a controller, coupled to the converter circuit and configured to control the converter circuit to cause the converter circuit to either boost or buck $V_{IN}$ to $V_{OUT}$;
(c) an auxiliary circuit, coupled to the controller and configured to provide various voltages and/or signals to the controller;
(d) an initial startup charge pump circuit, coupled to $V_{IN}$ and to the auxiliary circuit and configured to output a stepped-up voltage $V_{PUMP}$ greater than $V_{IN}$, wherein $V_{PUMP}$ is coupled to the auxiliary circuit and is sufficient to power the auxiliary circuit.

10. The invention of claim 9, wherein the initial startup charge pump circuit can be selectively disabled after a normal supply voltage from the converter circuit to the auxiliary circuit is sufficient to enable operation of the auxiliary circuit.

11. The invention of claim 9, wherein the initial startup charge pump circuit can be selectively enabled while a normal supply voltage from the converter circuit to the auxiliary circuit is insufficient to enable operation of the auxiliary circuit.

12. The invention of claim 9, wherein the power converter is one of a unidirectional power converter operated in a reverse configuration, or a bi-modal power converter.

13. The invention of claim 9, further including a current in-rush protection circuit coupled in series between $V_{IN}$ and the converter circuit, and coupled to and controlled by $V_{PUMP}$, the current in-rush protection circuit configured to limit current flow from $V_{IN}$ to the converter circuit for a period of time.

14. A power converter including:
(a) a converter circuit configured to be coupled between a voltage $V_{IN}$ and output a voltage $V_{OUT}$ to a load;
(b) a controller, coupled to the converter circuit and configured to control the converter circuit to cause the converter circuit to either boost or buck $V_{IN}$ to $V_{OUT}$;
(c) an auxiliary circuit, coupled to the controller and configured to provide various voltages and/or signals to the controller;
(d) an initial startup charge pump circuit, coupled to $V_{IN}$ and to the auxiliary circuit and including:
(1) a charge pump oscillator having an output that includes a train of pulses; and
(2) a charge pump core, coupled to the output of the charge pump oscillator and to $V_{IN}$, configured to output a stepped-up voltage $V_{PUMP}$ greater than $V_{IN}$, wherein $V_{PUMP}$ is coupled to the auxiliary circuit and is sufficient to power the auxiliary circuit.

15. The invention of claim 14, wherein the initial startup charge pump circuit can be selectively disabled after a normal supply voltage from the converter circuit to the auxiliary circuit is sufficient to enable operation of the auxiliary circuit.

16. The invention of claim 14, wherein the initial startup charge pump circuit can be selectively enabled while a normal supply voltage from the converter circuit to the auxiliary circuit is insufficient to enable operation of the auxiliary circuit.

17. The invention of claim 14, wherein the power converter is one of a unidirectional power converter operated in a reverse configuration, or a bi-modal power converter.

18. The invention of claim 14, further including a current in-rush protection circuit coupled in series between $V_{IN}$ and the converter circuit, and coupled to and controlled by $V_{PUMP}$, the current in-rush protection circuit configured to limit current flow from $V_{IN}$ to the converter circuit for a period of time.

* * * * *